United States Patent
Hilbuch et al.

(10) Patent No.: US 11,337,072 B2
(45) Date of Patent: May 17, 2022

(54) THRESHOLD BASED FRAUD MANAGEMENT FOR CLOUD COMPUTING SYSTEM

(71) Applicant: MICROSOFT TECHNOLOGY LICENSING, LLC, Redmond, WA (US)

(72) Inventors: Amit Sebastian Hilbuch, Sammamish, WA (US); Julian Federico Gonzalez, Issaquah, WA (US); Weng Keong Peter Anthony Leong, Redmond, WA (US); Shachar Gelbourt, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 186 days.

(21) Appl. No.: 15/835,269

(22) Filed: Dec. 7, 2017

(65) Prior Publication Data
US 2019/0182673 A1    Jun. 13, 2019

(51) Int. Cl.
*H04L 29/06* (2006.01)
*H04W 12/12* (2021.01)
(Continued)

(52) U.S. Cl.
CPC .......... *H04W 12/12* (2013.01); *G06F 21/121* (2013.01); *G06F 21/55* (2013.01); *G06F 21/577* (2013.01);
(Continued)

(58) Field of Classification Search
CPC ........ G06F 21/00; G06F 21/55; G06F 21/121; H04L 12/00; H04L 67/10; H04L 63/14; H04L 63/10; H04W 12/12; G06Q 10/0635
See application file for complete search history.

(56) References Cited

U.S. PATENT DOCUMENTS 10,482,231 B1    11/2019  Harding et al.
2007/0094491 A1   4/2007  Teo et al.
(Continued)

OTHER PUBLICATIONS

Ldziorek, et al., "Detecting Fraudulent use of Cloud Resources", In Proceedings of the 3rd ACM Workshop on Cloud Computing Security Workshop, Oct. 21, 2011, pp. 61-72.
(Continued)

*Primary Examiner* — Joseph P Hirl
*Assistant Examiner* — Leynna Truvan
(74) *Attorney, Agent, or Firm* — Jacob P. Rohwer; Newport IP, LLC

(57) ABSTRACT

Unauthorized and fraudulent use of a cloud computing system may be reduced or mitigated using a multi-threshold based method to identify fraudulent subscribers of the cloud. The multi-threshold based method may assign a fraud threshold to each resource of the cloud. The fraud thresholds of the multi-threshold based method may be adjusted based on one or more characteristics associated with one or more of the plurality of resources in the cloud. The one or more characteristics may include a capacity percentage associated with the plurality of resources, fraud distribution among the plurality of resources, cost of operation associated with the plurality of resources, anticipated or actual subscriber growth rate associated with the plurality of resources and/or anticipated or actual subscriber fraud risk associated with the plurality of resources.

20 Claims, 9 Drawing Sheets

(51) Int. Cl.
  G06F 21/55      (2013.01)
  H04L 67/10      (2022.01)
  G06Q 10/06      (2012.01)
  G06F 21/12      (2013.01)
  G06F 21/88      (2013.01)
  H04M 15/00      (2006.01)
  G06F 21/57      (2013.01)

(52) U.S. Cl.
  CPC ......... *G06F 21/88* (2013.01); *G06Q 10/0635* (2013.01); *H04L 63/14* (2013.01); *H04L 63/20* (2013.01); *H04L 67/10* (2013.01); *H04M 15/47* (2013.01); *H04M 15/83* (2013.01); *H04M 15/852* (2013.01); *H04M 15/883* (2013.01); *G06F 2221/034* (2013.01); *H04L 63/10* (2013.01)

(56) References Cited

U.S. PATENT DOCUMENTS

| | | | |
|---|---|---|---|
| 2011/0047045 A1* | 2/2011 | Brody | G06Q 30/0613 705/26.41 |
| 2014/0173737 A1 | 6/2014 | Toback et al. | |
| 2014/0250526 A1* | 9/2014 | Khanna | G06F 21/552 726/22 |
| 2014/0269269 A1* | 9/2014 | Kovvali | H04W 24/08 370/229 |
| 2015/0117344 A1 | 4/2015 | Arvidson et al. | |
| 2015/0149357 A1* | 5/2015 | Ioannidis | G06Q 20/3224 705/44 |
| 2016/0080402 A1 | 3/2016 | Smith et al. | |
| 2017/0228257 A1 | 8/2017 | Dong et al. | |
| 2018/0191747 A1 | 7/2018 | Nachenberg et al. | |
| 2018/0203751 A1 | 7/2018 | Lee et al. | |

OTHER PUBLICATIONS

"International Search Report and Written Opinion Issued in PCT Application No. PCT/US2018/062684", dated Feb. 4, 2019, 11 Pages.

"Office Action Issued in European Patent Application No. 18819416.1", dated Mar. 17, 2022, 4 Pages.

* cited by examiner

THRESHOLD BASED FRAUD MANAGEMENT FOR CLOUD COMPUTING SYSTEM

BACKGROUND

A public cloud computing system (also referred to as a "cloud") provides shared computing resources for use by customers. The computing resources of a cloud are hardware and software resources. The hardware resources include components of servers such as cores of central processing units (CPUs), graphics processing units (GPUs), main memory, secondary storage, and so on. The software resources include operating systems, database systems, accounting applications, and so on. A typical cloud may have several data centers at various locations throughout the world. Each data center may host many computing resources, such as tens of thousands of servers, and deploy significant software resources, such as many operating systems, database systems, and so on.

To use a cloud, a customer typically purchases a subscription to use the services of the cloud. When purchasing a subscription, a customer may provide billing information and be provided an account that is accessible using logon information such as a user name and password. To encourage users to become customers, a cloud provider may offer various incentives that allow the users to subscribe and use the cloud for a limited time. Once logged on, a customer can then use the servers of the cloud to execute computer programs such as for hosting websites, performing accounting functions, performing data analyses, and so on. A cloud may use various billing models such as a model based on amount of core usage, memory usage, and other resource usage.

Cloud computing systems, like other computer systems, are susceptible to cyber-attacks. These cyber-attacks may include viruses, worms, denial-of-service attacks, and so on. Cloud computing systems are also susceptible to fraudulent use of resources resulting from exploitation of a vulnerability in the sign-up process of the cloud. For example, a cloud may offer free 30-day subscriptions to new customers. As part of the sign-up process, the user may be provided with a Completely Automated Public Turing test to tell Computer and Humans Apart ("CAPTCHA"). If the user discovers a vulnerability in the sign-up process that allows the user to bypass or always pass the CAPTCHA, that user may be able to develop a computer program to create hundreds and thousands of new, but unauthorized, subscriptions. As another example, a user may have access to valid, but stolen, credit card numbers. Such a user can create hundreds of subscriptions using the stolen credit card numbers before the theft is identified. Such unauthorized users can then use the cloud computer resources at such a high rate that there are insufficient resources left to service the needs of authorized users. To help lessen the impact of such unauthorized and fraudulent uses, a cloud may be designed with a certain amount of capacity that is in excess of what is needed to support authorized users. The cost of purchasing and maintaining such excess capacity can be high. Due to the high cost of mitigating unauthorized and fraudulent users of a cloud, efforts are ongoing to identify and eradicate unauthorized and fraudulent users of the cloud.

It is with respect to these considerations and others that the disclosure made herein is presented.

SUMMARY

Techniques described herein relate to cloud computing system (also referred to as a "cloud") threshold based fraud management. In some implementations, the cloud computing system may include a plurality of data centers (also referred to herein as "resources"), that offer computing resources for a plurality of authorized users or cloud subscribers. The cloud computing system may offer these computing resources at a very low cost on an attractive pay-as-you-go model. However, the resources of the cloud computing system may be compromised due to unauthorized and fraudulent users or subscribers of the cloud computing system. Specifically, unauthorized and fraudulent subscribers of resources associated with the cloud computing system may increase the cost of maintaining such resources. Furthermore, unauthorized and fraudulent subscribers of resources associated with the cloud computing system may compromise the underlying resources of the system in a manner that reduces the operational efficiency of those resources. Such a reduction in the operational efficiency of cloud computing system resources may compromise authorized use of the cloud computing system.

Unauthorized and fraudulent use of a cloud computing system, according to some implementations, may be reduced or mitigated with greater efficiency using a multi-threshold based method to identify fraudulent subscribers of the cloud. In some implementations, the cloud may include a plurality of resources. The multi-threshold based method may assign a fraud threshold to each resource of the plurality of resources. Each of the fraud thresholds assigned to the plurality of resources may be linked to a key performance indicator (KPI). In some implementations, the KPI may require the multi-threshold based method to identify a predetermined percentage of the unauthorized and fraudulent subscribers in the cloud computing system while ensuring that erroneously identified unauthorized and fraudulent subscribers does not exceed a predetermined percentage. Each of the indicated predetermined percentages may change over time. In various implementations, the fraud thresholds of the multi-threshold based method may be adjusted based on one or more characteristics associated with one or more of the plurality of resources in the cloud. The one or more characteristics may include capacity percentage associated with the plurality of resources, fraud distribution among the plurality of resources, cost of operation associated with the plurality of resources, anticipated or actual subscriber growth rate associated with the plurality of resources and/or anticipated or actual subscriber fraud risk associated with the plurality of resources.

In some implementations, the threshold based fraud management techniques establish a fraud threshold for each resource in a cloud computing system. Furthermore, the fraud management techniques may assign a fraud score to each subscriber of the cloud computing system. The fraud score associated with each of the subscribers may be a value calculated based on one or more usage features associated with the cloud. In some implementations, the fraud score associated with each of the subscribers is a value that indicates a statistical probability that a subscriber is an unauthorized or fraudulent user of the cloud. In some implementations, subscribers of the cloud computing system may be assigned to a first resource of a plurality of resources associated with the cloud computing system, while other subscribers of the cloud may be assigned to a second resource of the plurality of resources. The cloud computing system may compare the fraud scores associated with the subscribers of the first resource against the fraud threshold of the first resource to identify fraudulent subscribers of the first resource, while the cloud may compare the fraud scores associated with the subscribers of the second resource against the fraud threshold of the second resource to identify fraudulent users of the second resource.

In some implementations, a cloud computing system may adjust one or more of the fraud thresholds associated with a plurality of resources of the cloud based on one or more characteristics associated with one or more of the plurality of resources. The one or more characteristics may include capacity percentage associated with the plurality of resources, fraud distribution among the plurality of resources, cost of operation associated with the plurality of resources, anticipated or actual subscriber growth rate associated with the plurality of resources and/or anticipated or actual subscriber fraud risk associated with the plurality of resources. In some implementations, it may be desirable to adjust the one or more of the fraud thresholds in a manner that ensures that a KPI linked to the entire cloud computing system is maintained or achieved.

In some implementations, a system is provided for managing subscriber fraud associated with a computing system. The computing system may include at least one processor. The system may further include at least one memory in communication with the at least one processor, the at least one memory having computer-readable instructions stored thereupon that, when executed by the at least one processor, cause the at least one processor to identify a first resource in the computing system, the first resource having a first plurality of subscribers linked thereto. Additionally, the computer-readable instructions may cause the at least one processor to identify a second resource in the computing system, the second resource having a second plurality of subscribers linked thereto, assign a first fraud threshold to the first resource in the computing system, and assign a second fraud threshold to the second resource in the computing system. Furthermore, the computer-readable instructions may cause the at least one processor to adjust at least one of the first and second fraud thresholds based on a characteristic associated with at least one of the first and second resources in the computing system, and suspend or terminate at least one subscriber associated with the computing system based on the adjusted at least one of the first and second fraud thresholds.

In some implementations, a computer-implemented method is provided for managing fraudulent use of a cloud computing system. The method may include assigning a first fraud threshold to a first data center associated with a cloud computing system, and assigning a second fraud threshold to second data center associated with the cloud computing system. Furthermore, the method may include adjusting at least one of the first and second fraud thresholds based on a characteristic associated with at least one of the first and second data centers associated with the cloud computing system, and suspending or terminating at least one subscriber associated with the cloud computing system based on the adjusted at least one of the first and second fraud thresholds.

In some implementations, a computer-readable storage medium is provided having computer-executable instructions stored thereupon which, when executed by one or more processors of a computing device, cause the one or more processors of the computing device to manage fraudulent use of a cloud computing system. Managing fraudulent use of the cloud computing system may include assigning a first fraud threshold to a first resource in a cloud computing system, and assigning a second fraud threshold to a second resource in the cloud computing system. Furthermore, managing fraudulent use of the cloud computing system may include adjusting the first and second fraud thresholds based on a characteristic associated with at least one of the first and second resources in the cloud computing system, and suspending or terminating at least one subscriber associated with the computing system based on the adjusted at least one of the first and second fraud thresholds.

It should be appreciated that, although described in relation to a system, the above-described subject matter may also be implemented as a computer-controlled apparatus, a computer process, a computing system, or as an article of manufacture such as a computer-readable medium and/or dedicated chipset. Among many other benefits, the techniques herein improve efficiencies with respect to a wide range of computing resources. For instance, operations can be performed on two or more values, e.g., summing, multiplying or otherwise to perform a number of complex tasks, such as facial recognition, object recognition, image generation, classification detection, etc.

These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
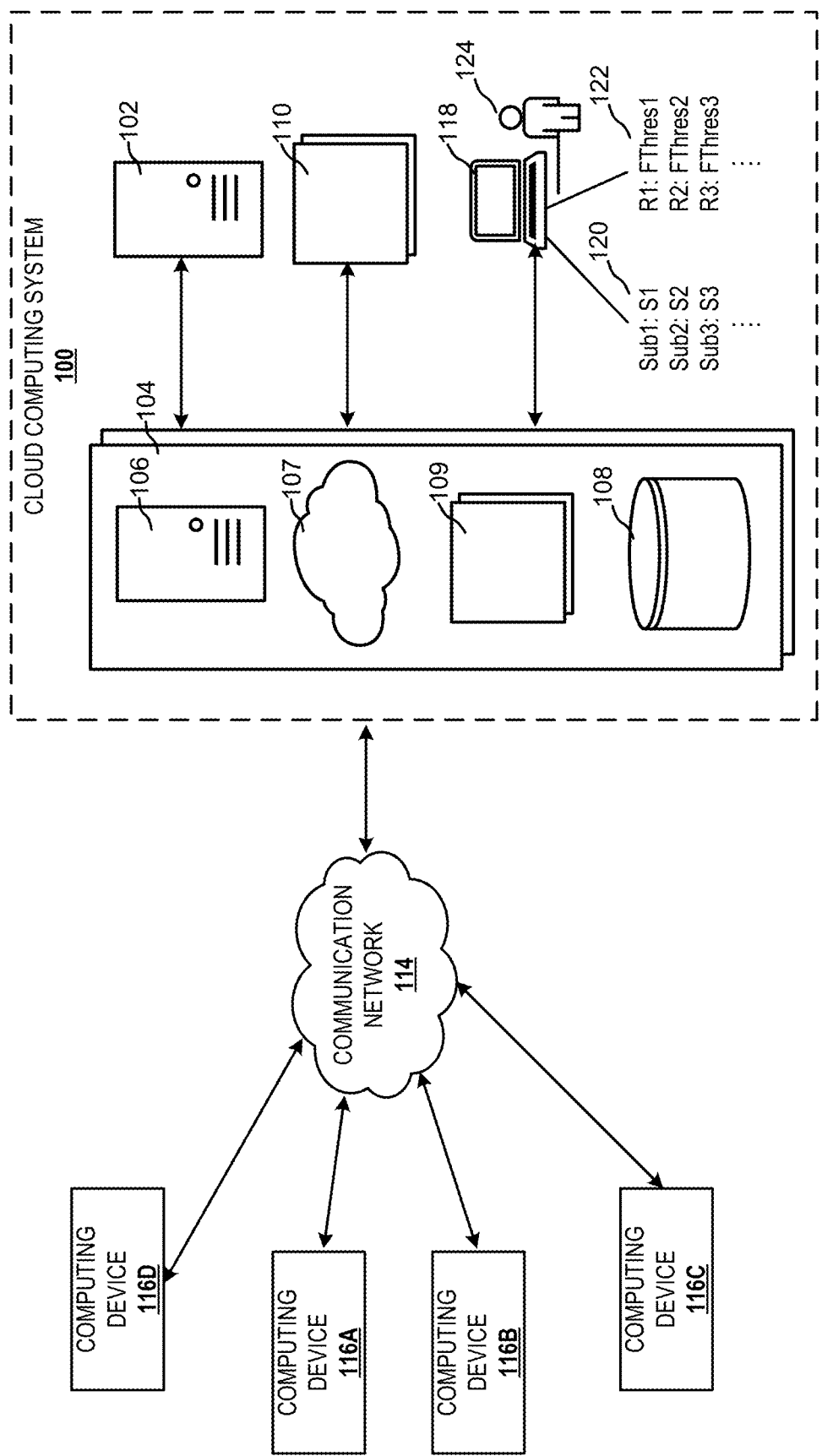
FIG. 1 illustrates an exemplary cloud computing system in accordance with the herein described systems and methods. The exemplary cloud computing system may comprise a plurality of resources, such as data centers and other related cloud computing system infrastructure.

Techniques described herein relate to cloud computing system (also referred to as a cloud) threshold based fraud management. In some implementations, the cloud computing system may include a plurality of data centers (also referred to as resources) herein, that offer computing resources for a plurality of authorized users or cloud subscribers. The cloud computing system may offer these computing resources at a very low cost on an attractive pay-as-you-go model. However, the resources of the cloud computing system may be compromised due to unauthorized and fraudulent users or subscribers of the cloud computing system. Specifically, unauthorized and fraudulent subscribers of resources associated with the cloud computing system may increase the cost of maintaining such resources. Furthermore, unauthorized and fraudulent subscribers of resources associated with the cloud computing system may compromise the underlying resources of the system in a manner that reduces the operational efficiency of those resources. Such a reduction in the operational efficiency of cloud computing system resources may compromise authorized use of the cloud computing system.

Unauthorized and fraudulent use of a cloud computing system, according to some implementations, may be reduced or mitigated with greater efficiency using a multi-threshold based method to identify fraudulent subscribers of the cloud. In some implementations, the cloud may include a plurality of resources. The multi-threshold based method may assign a fraud threshold to each resource of the plurality of resources. Each of the fraud thresholds assigned to the plurality of resources may be linked to a key performance indicator (KPI). In some implementations, the KPI may require the multi-threshold based method to identify a predetermined percentage of the unauthorized and fraudulent subscribers in the cloud computing system while ensuring that erroneously identified unauthorized and fraudulent subscribers do not exceed a predetermined percentage. Each of the indicated predetermined percentages may change over time. In various implementations, the fraud thresholds of the multi-threshold based method may be adjusted based on one or more characteristics associated with one or more of the plurality of resources in the cloud. The one or more characteristics may include capacity percentage associated with the plurality of resources, fraud distribution among the plurality of resources, cost of operation associated with the plurality of resources, anticipated or actual subscriber growth rate associated with the plurality of resources and/or anticipated or actual subscriber fraud risk associated with the plurality of resources.

In some implementations, the fraud threshold based fraud management techniques establish a fraud threshold for each resource in a cloud computing system. Furthermore, the fraud management techniques may assign a fraud score to each subscriber of the cloud computing system. The fraud score associated with each of the subscribers may be a value calculated based on one or more usage features associated with the cloud. In some implementations, the fraud score associated with each of the subscribers is a value that indicates a statistical probability that a subscriber is an unauthorized or fraudulent user of the cloud. In some implementations, subscribers of the cloud computing system may be assigned to a first resource of a plurality of resources associated with the cloud computing system, while other subscribers of the cloud may be assigned to a second resource of the plurality of resources. The cloud computing system may compare the fraud scores associated with the subscribers of the first resource against the fraud threshold of the first resource to identify fraudulent subscribers of the first resource, while the cloud may compare the fraud scores associated with the subscribers of the second resource against the fraud threshold of the second resource to identify fraudulent users of the second resource.

In some implementations, a cloud computing system may adjust one or more of the fraud thresholds associated with a plurality of resources of the cloud based on one or more characteristics associated with one or more of the plurality of resources. The one or more characteristics may include capacity percentage associated with the plurality of resources, fraud distribution among the plurality of resources, cost of operation associated with the plurality of resources, anticipated or actual subscriber growth rate associated with the plurality of resources and/or anticipated or actual subscriber fraud risk associated with the plurality of resources. In some implementations, it may be desirable to adjust the one or more of the fraud thresholds in a manner that ensures that a KPI linked to the entire cloud computing system is maintained or achieved.

In some implementations, a system is provided for managing subscriber fraud associated with a computing system. The computing system may include at least one processor. The system may further include at least one memory in communication with the at least one processor, the at least one memory having computer-readable instructions stored thereupon that, when executed by the at least one processor, cause the at least one processor to identify a first resource in the computing system, the first resource having a first plurality of subscribers linked thereto. Additionally, the computer-readable instructions may cause the at least one processor to identify a second resource in the computing system, the second resource having a second plurality of subscribers linked thereto, assign a first fraud threshold to the first resource in the computing system, and assign a second fraud threshold to the second resource in the computing system. Furthermore, the computer-readable instructions may cause the at least one processor to adjust at least one of the first and second fraud thresholds based on a characteristic associated with at least one of the first and second resources in the computing system, and suspend or terminate at least one subscriber associated with the computing system based on the adjusted at least one of the first and second fraud thresholds.

In some implementations, a computer-implemented method is provided for managing fraudulent use of a cloud computing system. The method may include assigning a first fraud threshold to a first data center associated with a cloud computing system, and assigning a second fraud threshold to a second data center associated with the cloud computing system. Furthermore, the method may include adjusting at least one of the first and second fraud thresholds based on a characteristic associated with at least one of the first and second data centers associated with the cloud computing system, and suspending or terminating at least one subscriber associated with the cloud computing system based on the adjusted at least one of the first and second fraud thresholds.

In some implementations, a computer-readable storage medium is provided having computer-executable instructions stored thereupon which, when executed by one or more processors of a computing device, cause the one or more processors of the computing device to manage fraudulent use of a cloud computing system. Managing fraudulent use of the cloud computing system may include assigning a first fraud threshold to a first resource in a cloud computing system, and assigning a second fraud threshold to the second resource in the cloud computing system. Furthermore, managing fraudulent use of the cloud computing system may include adjusting the first and second fraud thresholds based on a characteristic associated with at least one of the first and second resources in the cloud computing system, and suspending or terminating at least one subscriber associated with the computing system based on the adjusted at least one of the first and second fraud thresholds.

FIG. 1 illustrates an exemplary a cloud computing system 100. The cloud computing system 100 may be any suitable arrangement of resources, operated by a cloud operator, for execution of software applications on behalf of subscribers of the cloud computing system 100. A cloud operator may be any suitable entity or collection of entities responsible for the cloud computing system 100. The subscribers of the cloud computing system 100 may similarly be any suitable entity or collection of entities responsible for a software application to be executed by the cloud computing system 100. For example, either or both of the cloud operator and the subscribers may be a human, a collection of humans, a commercial or non-commercial organization, a collection of commercial or non-commercial organizations, or any other suitable entity.

As illustrated in FIG. 1, the cloud computing system 100 includes various elements, including a resource allocator 102 and resources 104. The resource allocator 102 acts on behalf of the cloud operator to manage allocation of the resources 104 for execution of one or more software applications 110. The software applications 110 are executed by allocated resources of the cloud computing system 100 on behalf of subscribers of the cloud computing system 100. The resources 104 that may be allocated to software applications 110 include any suitable types of resources, including hardware resources, like processing resources 106, networking resources 107, information storage resources 108, and software resources like software 109. The processing resources 106 may include hardware processors (e.g., microprocessors). The networking resources 107 may include any suitable networking hardware, including input/output hardware like network interface cards (NICs) and transmission hardware like routers, hubs, switches, etc., and networking cable for conveying information that have properties. The networking resources 107 may include resources for use by software application(s) 110 as well as networking resources connecting other resources 104 via any suitable local, wide-area, and/or enterprise communication network. The information storage resources 108 may include any suitable devices or media on which information may be encoded. The software resources 109 may include copies of software that may be used by one or more software applications 110 and/or by the cloud computing system 100 while executing the software application(s) 110, as well as any suitable licenses for such software. In some implementations, the resources 104 are data centers associated with the cloud computing system 100. As will be described in further detail herein, such data centers may include a plurality of components that include processing cores, computing storage, sockets, node enclosures, racks, containers and virtual machines. Furthermore, each of the resources 104 may be located in a different geographic area. For example, one of the resources 104 may be located in Europe, another the resources 104 may be located in the United States, and so on. Users or subscribers of the cloud computing system 100 may access the resources 104 using, for example, a computing device, such as one of the computing devices 116A-116D. In some implementations, users or subscribers of the cloud computing system 100 may have access to just one of the resources 104 of the cloud 100. In other implementations, users or subscribers of the cloud computing system 100 may have access to a plurality of the resources 104 of the cloud 100.

While not illustrated in FIG. 1, the resources 104 may also include any suitable utility resources associated with other resources 104 of the cloud computing system 100. For example, the resources 104 may further include utility resources such as energy resources like electricity. As another example, the resources 104 may further include supporting resources like an air supply for cooling other resources (e.g., a cooling system for a processing resource 106). Any suitable resources may be included as the resources 104 of the cloud computing system 100.

The resources 104 may be allocated by the resource allocator 102 in any suitable manner. In some implementations, the resources 104 may be allocated as virtual machines or using any other conventional approach that uses virtualization.

The software applications 110 may include any suitable type of application. One type of application is a batch application, which performs predefined processing within a specified period of time. Another type of application is a user-interactive application. User-interactive applications are those applications that interact with a user and include functionality to perform user operations requested by the users, such as subscribers of the cloud computing system 100. This may be any suitable type of functionality or user operations, as implementations described herein are not limited in this respect. Users of the software applications 110 may operate user computing devices, such as the user computing devices 116A, 116B, 116C and 116D to exchange information with the cloud computing system 100 and with the software applications 110 executing on the cloud computing system 100. The exchanged information may be, for example, requests for information sent by the user computing devices 116A, 116B, 116C and 116D, and responses to the requests sent by the cloud computing system 100. The user computing devices 116A, 116B, 116C and 116D may exchange information with the cloud computing system 100 via a communication network 114, which may be any suitable one or more wired and/or wireless networks, including the Internet.

When the cloud computing system 100 is executing software applications 110, some of the resources 104 of the cloud computing system 100 are allocated to each software application of the applications 110. When resources 104 are allocated to the software application 110, the resources 104 may execute instructions of the software application 110, store information managed by the software application 110, or perform any other functionality of hardware related to executing the software application 110. For example, as part of executing the software application 110, the resources 104 may receive a request for information from a user computing device 116A, process the request, retrieve the requested information, process the requested information, and respond to the user computing device 116A with the requested information.

The cloud computing system 100 may also include a fraud detection manager 118. The fraud detection manager 118 may operate autonomously within the cloud computing system 100. In other implementations, the fraud detection manager 118 is caused to operate by way of one or more fraud detection experts 124 associated with the cloud computing system 100.

The fraud detection manager 118 is functional to detect fraudulent or unauthorized subscriber use of one or more of the resources 104 in the cloud computing system 100. For example, high or exceptionally high use of one or more of the resources 104 by one or more subscribers may be an indicator of fraudulent or unauthorized subscriber use of the cloud computing system 100. There may be other indicators of fraudulent or unauthorized subscriber use of the cloud computing system 100. The fraud detection manager 118 is able to analyze such indicators and provide recourse if it is determined that one or more subscribers of the cloud computing system 100 is perpetrating fraudulent behavior. Such recourse may include suspending or terminating subscribers that are determined to be fraudulent or unauthorized subscribers of the cloud computing system 100.

The fraud detection manager 118 includes a number of tools, such as subscriber fraud scores 120 and resource fraud thresholds 122, that enable the fraud detection manager 118 to detect fraudulent or unauthorized subscriber use of one or more of the resources 104 in the cloud computing system 100. In that regard, in some implementations, the fraud detection manager 118 determines and/or assigns a fraud score (e.g., S1) to each subscriber (e.g., Sub1) of the cloud computing system 100. Furthermore, the fraud detection manager 118 may assign a fraud threshold (e.g., Thres1) to each of the resources 104 (e.g., R1) in the cloud computing system 100.

The fraud detection manager 118 is functional to compare fraud scores of subscribers linked to a particular resource 104 of the cloud computing system 100 against the fraud threshold assigned to that resource 104. If a subscriber of the resource 104 is found to have a fraud score that is greater than the fraud threshold assigned to the resource 104, the fraud detection manager 118 may take action to suspend or terminate the suspected fraudulent subscriber's use of the cloud computing system 100.

The fraud score associated with each of the subscribers may be a value calculated based on one or more subscriber usage features associated with the cloud computing system 100. In some implementations, the fraud score associated with each of the subscribers is a value that indicates a statistical probability that a subscriber is an unauthorized or fraudulent user of the cloud computing system 100. For example, a fraud score may be a value greater than or equal to 0 and less than or equal to 1. A fraud score that is approaching 0 indicates that a subscriber is very unlikely to be a fraudulent user of the cloud computing system 100, while a fraud score approaching 1 indicates that a subscriber is very likely to be a fraudulent user of the cloud computing system 100.

Similarly, each of the fraud thresholds linked to the resources 104 may be a value greater than or equal to 0 and less than or equal to 1. Therefore, assuming a fraud score value format as described in the foregoing, a resource 104 of the cloud computing system 100 that has an assigned fraud threshold that is approaching 0 indicates that the resource 104 has a low tolerance for subscribers that are suspected to be fraudulent or unauthorized users of the cloud computing system 100, while an assigned fraud threshold that is approaching 1 indicates that the resource 104 has a high tolerance for subscribers that are suspected to be fraudulent or unauthorized users of the cloud computing system 100.

In some implementations, subscribers of the cloud computing system 100 may be assigned to a first resource of the resources 104 associated with the cloud computing system 100, while other subscribers of the cloud computing system 100 may be assigned to a second resource of the resources 104, and so on. The cloud computing system 100 may compare the fraud scores associated with the subscribers of the first resource against the fraud threshold of the first resource to identify fraudulent subscribers of the first resource, while the cloud computing system 100 may compare the fraud scores associated with the subscribers of the second resource against the fraud threshold of the second resource to identify fraudulent users of the second resource.

In some implementations, the cloud computing system 100 may adjust one or more of the thresholds associated with the resources 104 based on one or more characteristics associated with one or more of the resources 104. The one or more characteristics may include capacity percentage associated with the resources 104, fraud distribution among the resources 104, cost of operation associated with the resources 104, anticipated or actual subscriber growth rate associated with the resources 104 and/or anticipated or actual subscriber fraud risk associated with the resources 104. In some implementations, it may be desirable to adjust the one or more of the thresholds in a manner that ensures that a KPI linked to the entire cloud computing system 100 is maintained or achieved.

Figure 2:
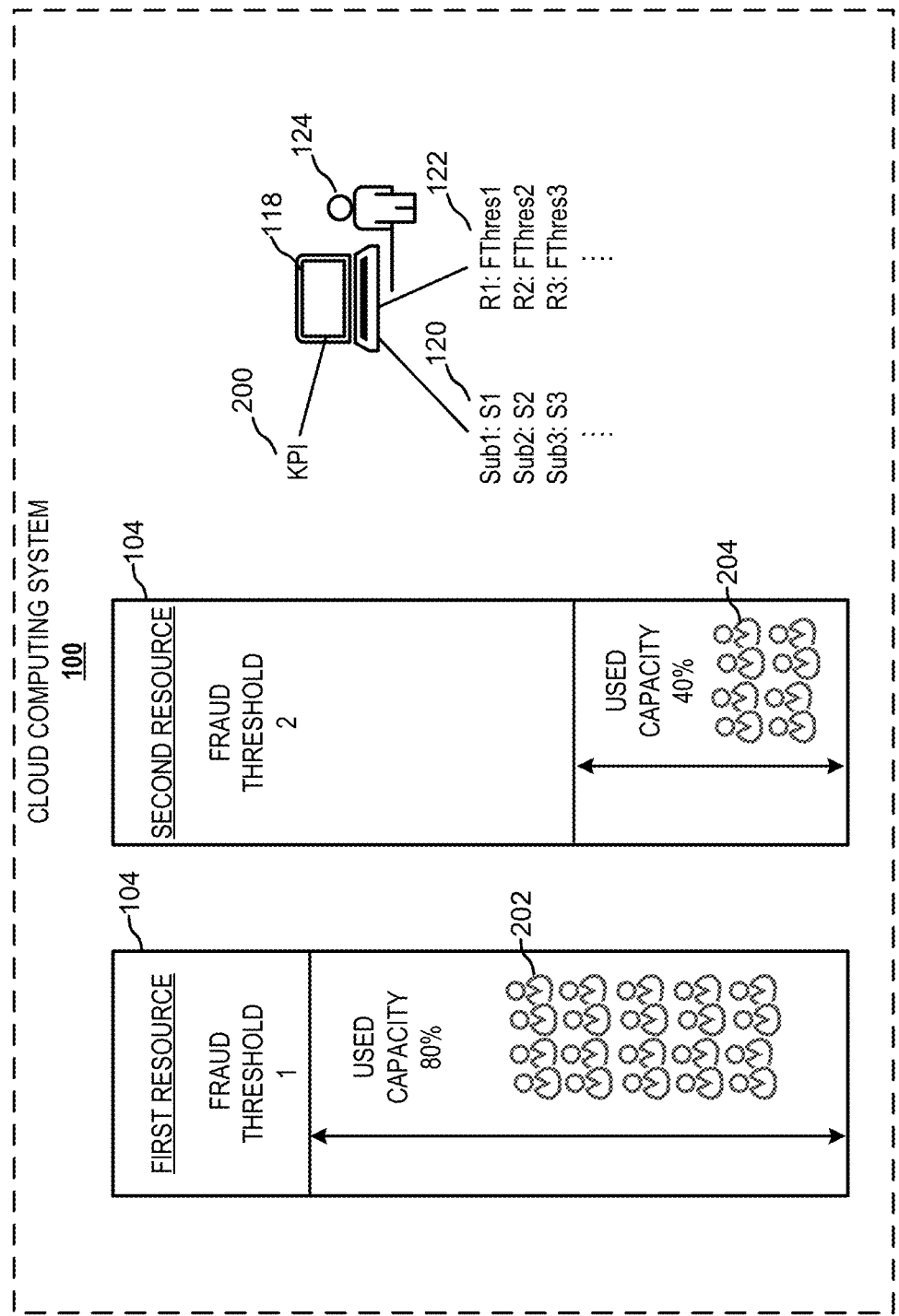
FIG. 2 illustrates an exemplary view of the cloud computing system from FIG. 1 in accordance with the herein described systems and methods. This view of the cloud computing system shows adjusting fraud thresholds of a plurality of resources based on capacity associated with the plurality of resources.

FIG. 2 illustrates an exemplary view of the cloud computing system 100 from FIG. 1. The exemplary view of the cloud computing system 100 in FIG. 2 omits, for clarity, a number of components associated with the cloud computing system 100 illustrated in FIG. 1.

The illustrated first resource 104 may include a plurality of components that include processing cores, computing storage, sockets, node enclosures, racks, containers and virtual machines. Consumption of a plurality of components by subscribers of the first resource 104 may increase the overall used capacity associated with the first resource 104. Specifically, as processing cores, computing storage, sockets, node enclosures, and so forth, are used by the subscribers of the first resource 104, the percentage of used capacity associated with the first resource 104 increases. The foregoing also applies to the second resource 104.

The illustrated example of the cloud computing system 100 of FIG. 2 shows that the first resource 104 has a used capacity of 80%, and that the second resource 104 has a used capacity of 40%. The fraud detection manager 118 may manage a fraud threshold 1 associated with the first resource 104. Furthermore, the fraud detection manager 118 may manage a fraud threshold 2 associated with the second resource 104. In some implementations, the fraud detection manager 118 manages at least one of the fraud thresholds 1 and 2 based on usage capacity associated with the first resource 104 and/or the second resource 104. For example, the fraud detection manager 118 may set the fraud threshold 1 to a lower threshold value compared to the fraud threshold 2 because the used capacity of the first resource 104 is greater than or significantly greater than the used capacity of the second resource 104. Furthermore, in some implementations, the fraud detection manager 118 may correspondingly increase the fraud threshold 2 to a higher threshold value to balance the lowering of the fraud threshold 1.

As described herein, when a subscriber of a particular resource 104 is found to have a fraud score that is greater than the fraud threshold assigned to the resource 104, the fraud detection manager 118 may take action to suspend or terminate the suspected fraudulent subscriber's use of the cloud computing system 100. Therefore, the lower fraud threshold 1 of the first resource 104 may increase the number of subscribers of the first resource 104 that are flagged by the fraud detection manager 118 as being likely or suspected fraudulent users 202 of the cloud computing system 100. Such likely or suspected fraudulent users 202 of the cloud computing system 100 may have their subscriptions suspended or terminated by the fraud detection manager 118. Comparatively, the second resource 104 may have fewer subscribers that are flagged by the fraud detection manager as being likely or suspected fraudulent users 204 of the cloud computing system 100.

In some implementations, the fraud thresholds 1 and 2 are collectively linked to a KPI 200 associated with the cloud computing system 100. The KPI 200 may establish or set a baseline requirement that the fraud detection manager 118 identify a predetermined percentage of the unauthorized and fraudulent subscribers in the cloud computing system 100, while ensuring that erroneously identified unauthorized or fraudulent subscribers do not exceed a predetermined percentage.

Figure 3:
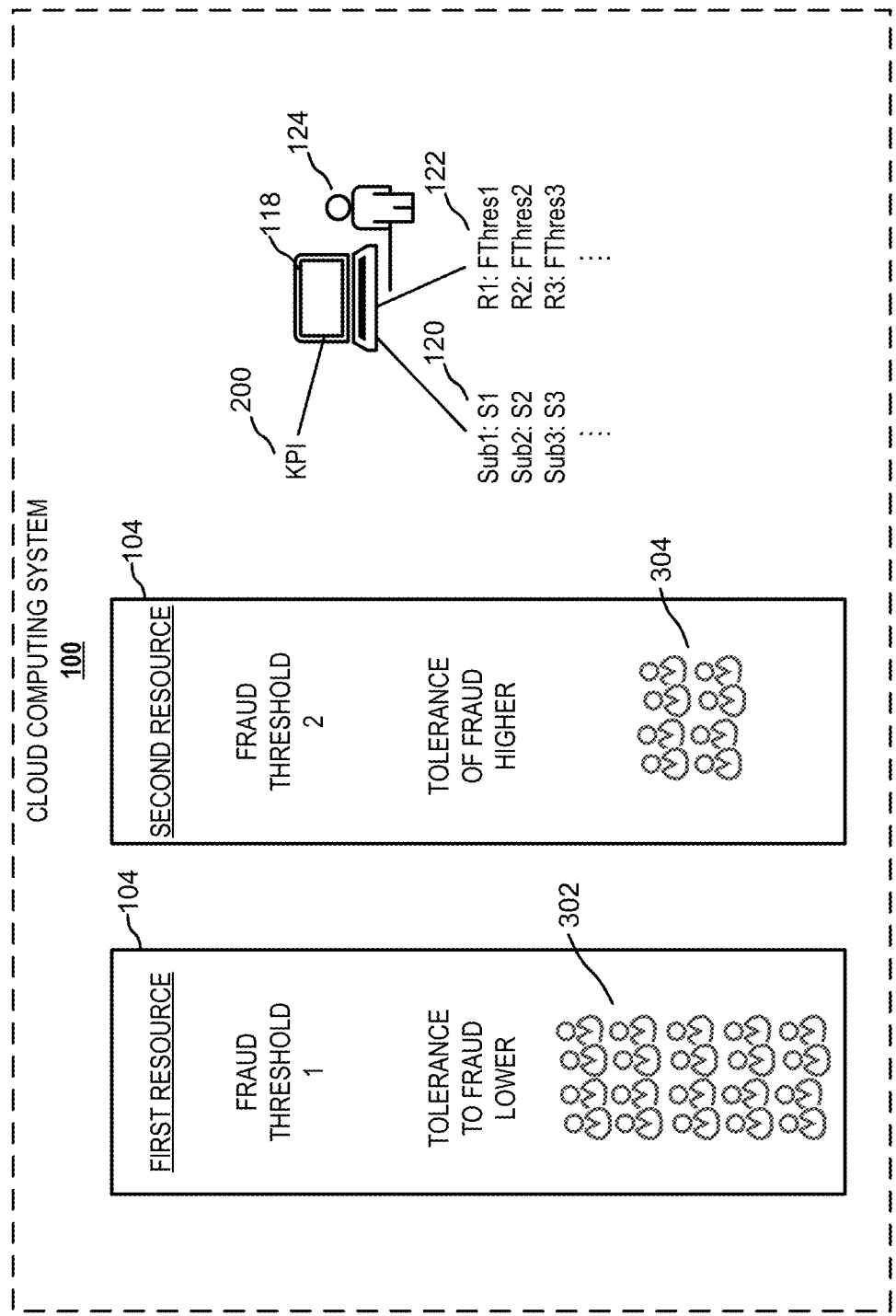
FIG. 3 illustrates an exemplary view of the cloud computing system from FIG. 1 in accordance with the herein described systems and methods. This view of the cloud computing system shows adjusting fraud thresholds of a plurality of resources based on fraud distribution associated with the plurality of resources.

FIG. 3 illustrates an exemplary view of the cloud computing system 100 from FIG. 1. The exemplary view of the cloud computing system 100 in FIG. 3 omits, for clarity, a number of components associated with the cloud computing system 100 illustrated in FIG. 1.

FIG. 3 illustrates that the first resource 104 has a tolerance to fraud that is lower than a tolerance to fraud of the second resource 104. In some implementations, the fraud detection manager 118 manages the tolerance to fraud for each of the first and second resources 104. For example, the fraud detection manager 118 may determine that the first resource 104 is to have a lower fraud tolerance compared to the fraud tolerance of the second resource 104 based on: a geographic location of the first resource 104, an overall capability or capacity of the first resource 104 compared to an overall capability or capacity of the second resource 104, a number of subscribers linked to the first resource 104 compared to a number of subscribers linked to the second resource 104, or the like. Therefore, in some implementations, the fraud detection manager 118 may set the fraud threshold 1 lower than the fraud threshold 2 in consideration of the lower tolerance to fraud associated with the first resource 104. In some implementations, setting the fraud threshold 1 lower than the fraud threshold 2 may necessitate increasing the fraud threshold 2 so that the KPI 200 associated with the cloud computing system 100 is maintained.

As described herein, when a subscriber of a particular resource 104 is found to have a fraud score that is greater than the fraud threshold assigned to the resource 104, the fraud detection manager 118 may take action to suspend or terminate the suspected fraudulent subscriber's use of the cloud computing system 100. Therefore, the lower fraud threshold 1 of the first resource 104 may increase the number of subscribers of the first resource 104 that are flagged by the fraud detection manager 118 as being likely or suspected fraudulent users waiter of the cloud computing system 100. Such likely or suspected fraudulent users 302 of the cloud computing system 100 may have their subscriptions suspended or terminated by the fraud detection manager 118. Comparatively, the second resource 104 may have fewer subscribers that are flagged by the fraud detection manager 118 as being likely or suspected fraudulent users 304 of the cloud computing system 100.

Figure 4:
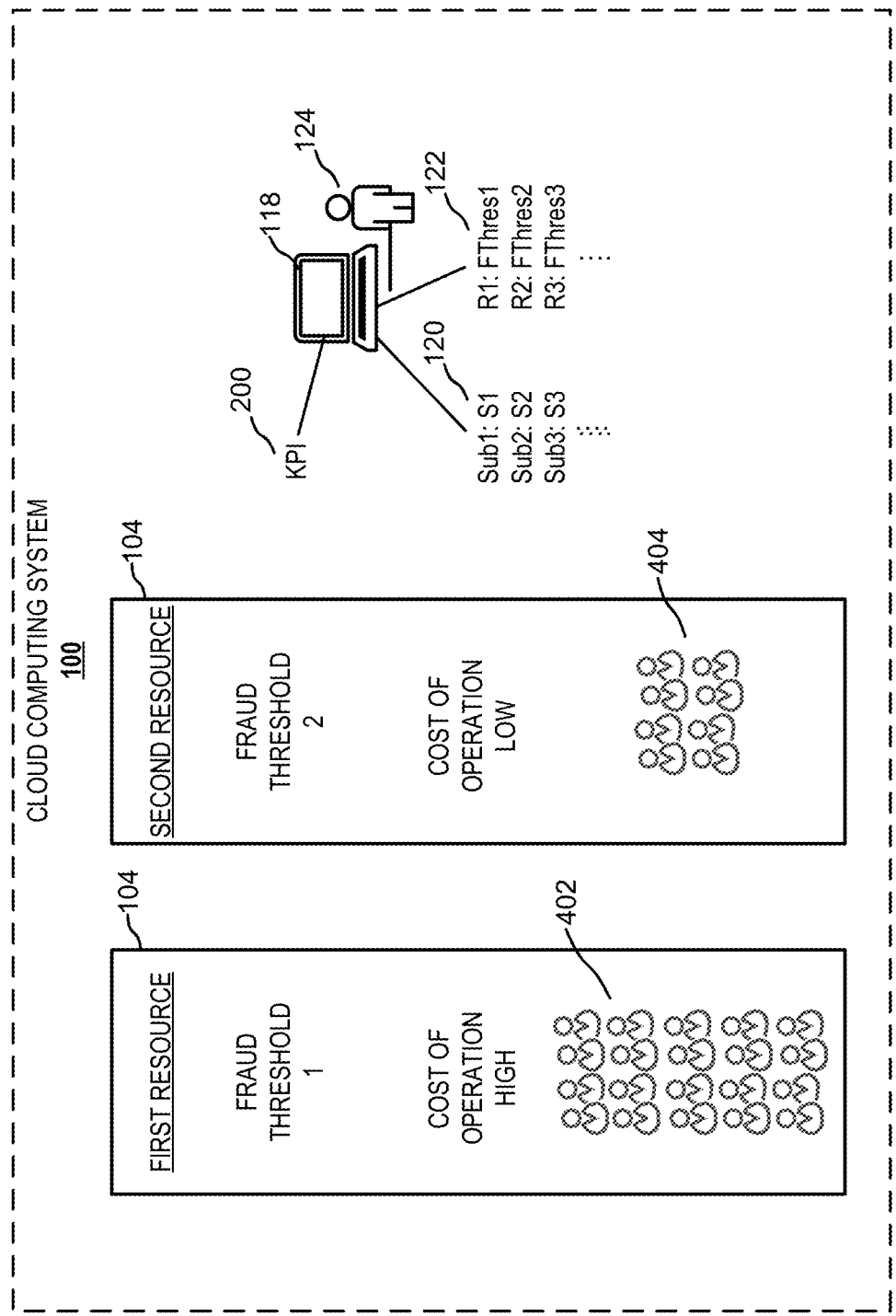
FIG. 4 illustrates an exemplary view of the cloud computing system from FIG. 1 in accordance with the herein described systems and methods. This view of the cloud computing system shows adjusting fraud thresholds of a plurality of resources based on cost of operation associated with the plurality of resources.

FIG. 4 illustrates an exemplary view of the cloud computing system 100 from FIG. 1. The exemplary view of the cloud computing system 100 in FIG. 4 omits, for clarity, a number of components associated with the cloud computing system 100 illustrated in FIG. 1.

FIG. 4 illustrates that the first resource 104 has a cost of operation that is higher than a cost of operation of the second resource 104. The cost of operation of each of the resources 104 may be influenced by: a geographical location of a given resource 104, the amount of hardware and software deployed by a given resource 104, the type or number of subscribers associated with a given resource 104, and so on. In some implementations, the fraud detection manager 118 analyzes the first and second resources 104 to determine the cost of operation associated with each of the resources 104. In other implementations, the cost of operation associated with each of the first and second resources 104 are predetermined by another entity associated with the cloud computing system 100. Nonetheless, in some implementations, the fraud detection manager 118 may set the fraud threshold 1 lower than the fraud threshold 2 in consideration of the high cost of operation associated with the first resource 104. In some implementations, setting the fraud threshold 1 lower than the fraud threshold 2 may necessitate increasing the fraud threshold 2 so that the KPI 200 associated with the cloud computing system 100 is maintained.

As described herein, when a subscriber of a particular resource 104 is found to have a fraud score that is greater than the fraud threshold assigned to the resource 104, the fraud detection manager 118 may take action to suspend or terminate the suspected fraudulent subscriber's use of the cloud computing system 100. Therefore, the lower fraud threshold 1 of the first resource 104 may increase the number of subscribers of the first resource 104 that are flagged by the fraud detection manager 118 as being likely or suspected fraudulent users 402 of the cloud computing system 100. Such likely or suspected fraudulent users 402 of the cloud computing system 100 may have their subscriptions suspended or terminated by the fraud detection manager 118. Comparatively, the second resource 104 may have fewer subscribers that are flagged by the fraud detection manager as being likely or suspected fraudulent users 404 of the cloud computing system 100.

Figure 5:
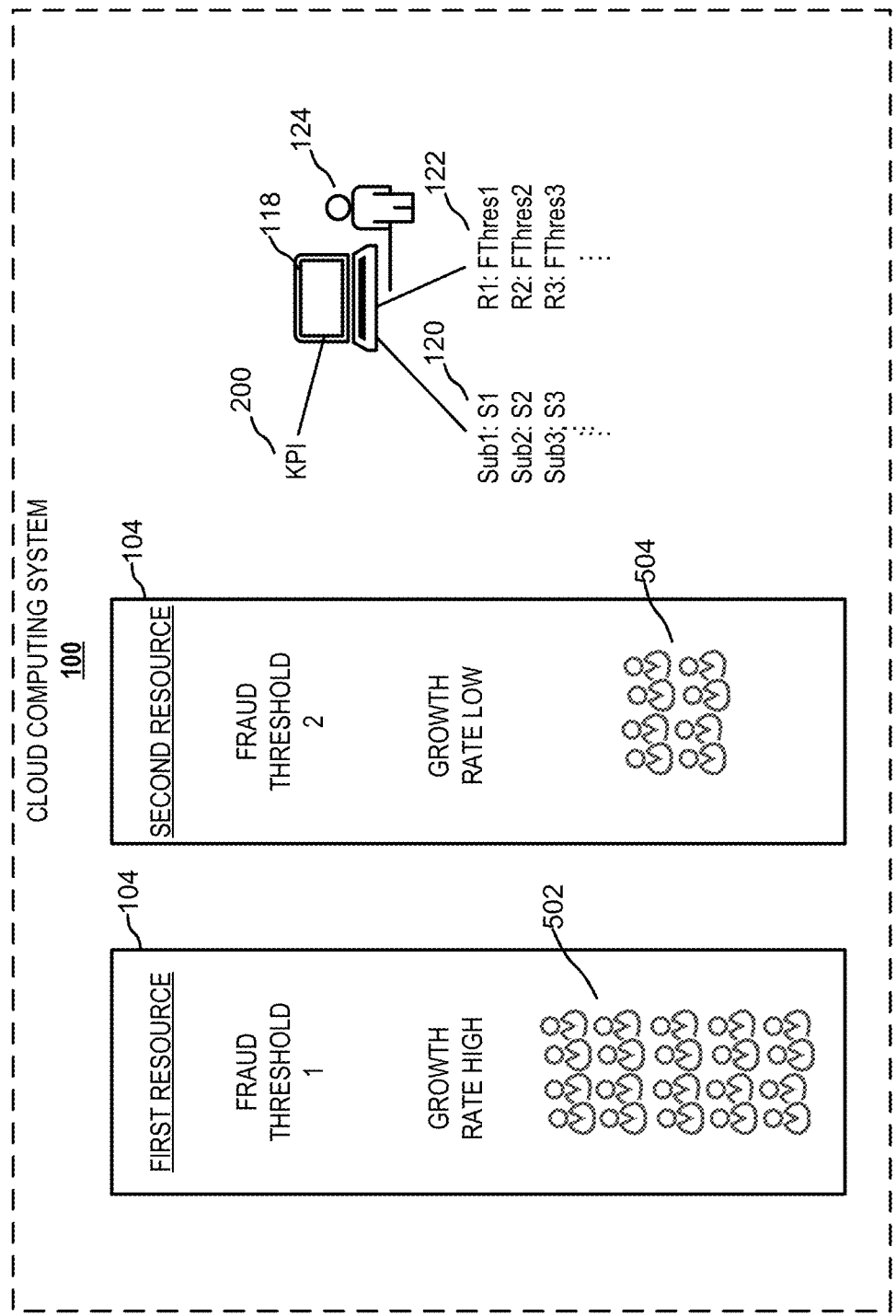
FIG. 5 illustrates an exemplary view of the cloud computing system from FIG. 1 in accordance with the herein described systems and methods. This view of the cloud computing system shows adjusting fraud thresholds of a plurality of resources based on an anticipated or actual subscriber growth rate associated with the plurality of resources.

FIG. 5 illustrates an exemplary view of the cloud computing system 100 from FIG. 1. The exemplary view of the cloud computing system 100 in FIG. 5 omits, for clarity, a number of components associated with the cloud computing system 100 illustrated in FIG. 1.

FIG. 5 illustrates that the first resource 104 has an anticipated or actual subscriber growth rate that is higher than an anticipated or actual subscriber growth rate of the second resource 104. The subscriber growth rate of each of the resources 104 may be influenced by: a geographical location of a given resource 104, the amount of hardware and software deployed or to be deployed by a given resource 104, the type or number of subscribers associated with a given resource 104, and so on. In some implementations, the fraud detection manager 118 analyzes the first and second resources 104 to determine an anticipated or actual subscriber growth rate associated with each of the resources 104. In other implementations, the anticipated or actual subscriber growth rate associated with each of the first and second resources 104 are predetermined by another entity associated with the cloud computing system 100. Nonetheless, in some implementations, the fault detection manager 118 may set the fraud threshold 1 lower than the fraud threshold 2 in consideration of the high anticipated or actual growth rate associated with the first resource 104. In some implementations, setting the fraud threshold 1 lower than the fraud threshold 2 may necessitate increasing the fraud threshold 2 so that the KPI 200 associated with the cloud computing system 100 is maintained.

As described herein, when a subscriber of a particular resource 104 is found to have a fraud score that is greater than the fraud threshold assigned to the resource 104, the fraud detection manager 118 may take action to suspend or terminate the suspected fraudulent subscriber's use of the cloud computing system 100. Therefore, the lower fraud threshold 1 of the first resource 104 may increase the number of subscribers of the first resource 104 that are flagged by the fraud detection manager 118 as being likely or suspected fraudulent users 502 of the cloud computing system 100. Such likely or suspected fraudulent users 502 of the cloud computing system 100 may have their subscriptions suspended or terminated by the fraud detection manager 118. Comparatively, the second resource 104 may have fewer subscribers that are flagged by the fraud detection manager as being likely or suspected fraudulent users 504 of the cloud computing system 100.

Figure 6:
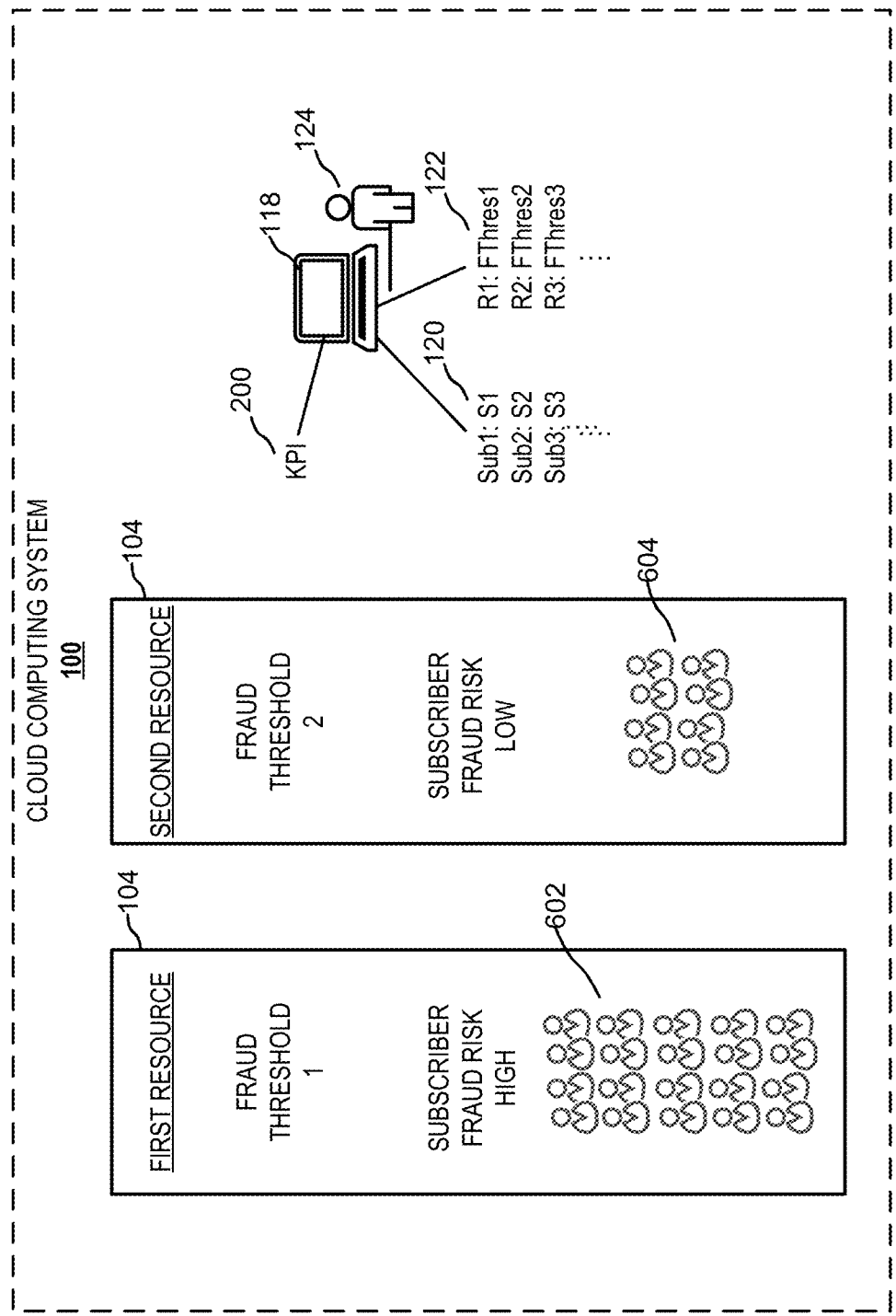
FIG. 6 illustrates an exemplary view of the cloud computing system from FIG. 1 in accordance with the herein described systems and methods. This view of the cloud computing system shows adjusting fraud thresholds of a plurality of resources based on an anticipated or actual subscriber fraud risk associated with the plurality of resources.

FIG. 6 illustrates an exemplary view of the cloud computing system 100 from FIG. 1. The exemplary view of the cloud computing system 100 in FIG. 6 omits, for clarity, a number of components associated with the cloud computing system 100 illustrated in FIG. 1.

FIG. 6 illustrates that the first resource 104 has an anticipated or actual subscriber fraud risk that is higher than an anticipated or actual subscriber fraud risk of the second resource 104. The subscriber fraud risk of each of the resources 104 may be influenced by a geographical location of a given resource 104, the type or number of subscribers associated with a given resource 104, and so on. In some implementations, the fraud detection manager 118 analyzes the first and second resources 104 to determine an anticipated or actual subscriber fraud risk associated with each of the resources 104. In other implementations, the anticipated or actual subscriber fraud risk associated with each of the first and second resources 104 are predetermined by another entity associated with the cloud computing system 100. Nonetheless, in some implementations, the fault detection manager 118 may set the fraud threshold 1 lower than the fraud threshold 2 in consideration of the high anticipated or actual subscriber fraud risk associated with the first resource 104. In some implementations, setting the fraud threshold 1 lower than the fraud threshold 2 may necessitate increasing the fraud threshold 2 so that the KPI 200 associated with the cloud computing system 100 is maintained.

As described herein, when a subscriber of a particular resource 104 is found to have a fraud score that is greater than the fraud threshold assigned to the resource 104, the fraud detection manager 118 may take action to suspend or terminate the suspected fraudulent subscriber's use of the cloud computing system 100. Therefore, the lower fraud threshold 1 of the first resource 104 may increase the number of subscribers of the first resource 104 that are flagged by the fraud detection manager 118 as being likely or suspected fraudulent users 602 of the cloud computing system 100. Such likely or suspected fraudulent users 602 of the cloud computing system 100 may have their subscriptions suspended or terminated by the fraud detection manager 118. Comparatively, the second resource 104 may have fewer subscribers that are flagged by the fraud detection manager as being likely or suspected fraudulent users 604 of the cloud computing system 100.

Figure 7:
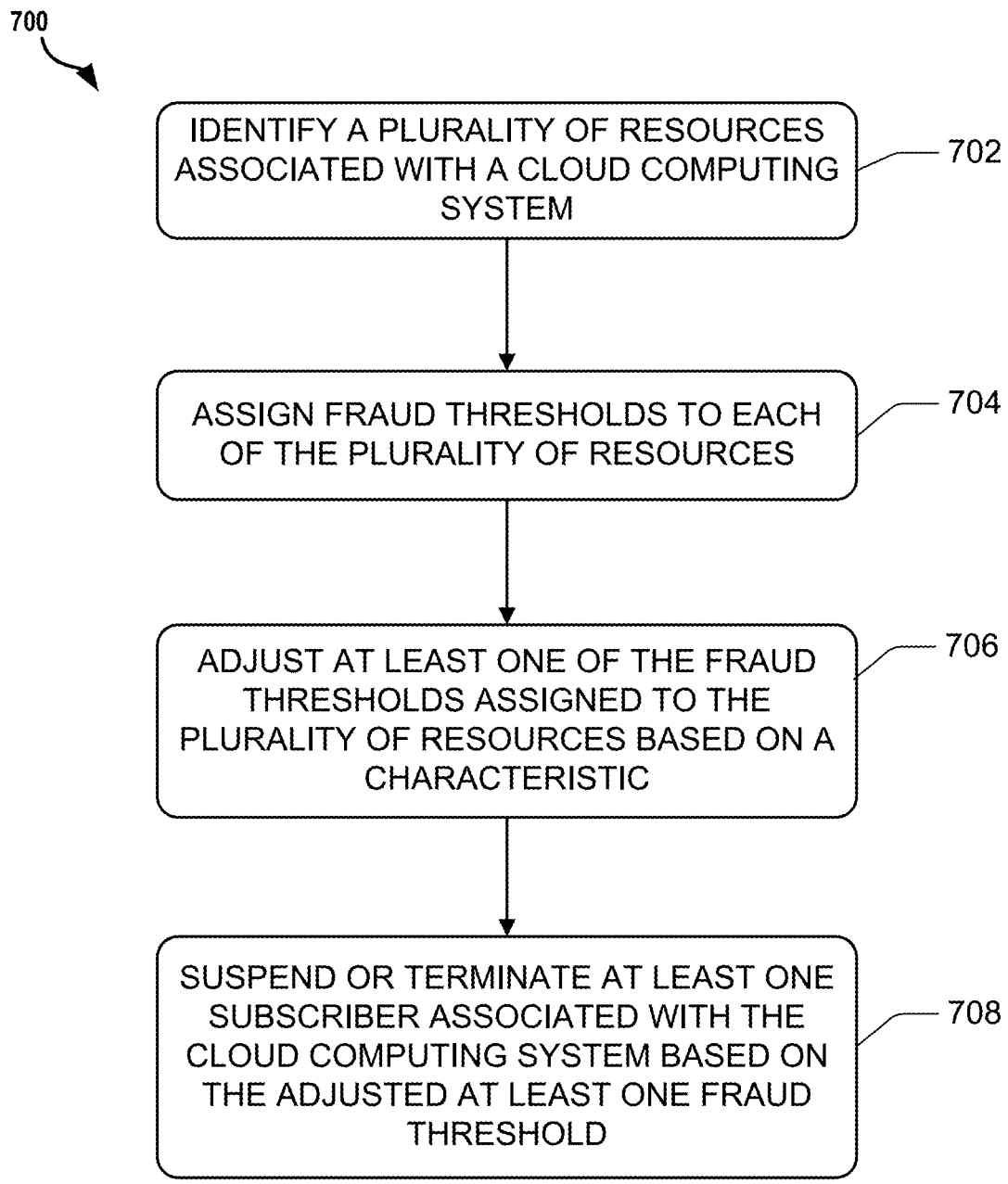
FIG. 7 is a flow diagram of an illustrative process for multi-threshold based management of subscriber fraud for cloud computing systems.

Turning now to FIG. 7, aspects of a routine 700 related to multi-threshold based management of subscriber fraud for cloud computing systems are described. It should be understood that the operations of the methods (e.g., routines) disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. Furthermore, it is to be understood that the routine 700 may be implemented by one or more of the elements and components illustrated in FIGS. 1-6 and 8-9 and the related description of those figures.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The operations of the routine 700 are described herein as being implemented, at least in part, by an application, component and/or circuit, such as one or more of the operational elements of the neural network environments described herein. In some configurations, the neural network environments may implement a compiled program, an interpreted program, a script or any other executable set of instructions. One or more of the implemented compiled program, interpreted program, script or any other executable set of instructions may be executed by at least one processor to cause one or more of the operations of the routine 700 to operate.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by an application, component and/or circuit, such as the one or more of the elements associated with the described neural network environments. Although the following illustration may refer to the components or elements of FIGS. 1-6 and 8-9 it can be appreciated that the operations of the routine 700 may also be implemented in many other ways. In addition, one or more of the operations of the routine 700 may alternatively or additionally be implemented, at least in part, by a chipset working alone or in conjunction with other software modules. Any service, circuit or application suitable for providing the techniques disclosed herein can be used in operations described herein.

At block 702, a plurality of resources 104 associated with a cloud computing system 100 are identified. In some implementations, the plurality of resources 104 are data centers of the cloud computing system 100. The data centers may be co-located in a general geographic location. Alternatively, one or more of the data centers associated with the cloud computing system 100 may be located in diverse geographical areas across the globe. Each of the data centers may host subscribers or users of the cloud computing system 100. Some of the hosted subscribers or users may be fraudulent or unauthorized users of the cloud computing system 100.

At block 704, a fraud threshold (e.g., fraud threshold 1, fraud threshold 2) is assigned to each of the plurality of resources 104. In some implementations, each of the fraud thresholds may be adjusted by the cloud computing system 100 based on a characteristic associated with each of the plurality of resources 104. Furthermore, each of the fraud thresholds may be a value that is greater than or equal to 0 and less than or equal to 1. A fraud threshold value approaching 0 signifies a low tolerance of unauthorized and fraudulent subscriber use of one or more resources in the cloud computing system 100 and a fraud threshold value approaching 1 signifies a high tolerance of unauthorized and fraudulent subscriber use of one or more resources in the cloud computing system 100.

At block 706, at least one of the fraud thresholds assigned to the plurality of resources is adjusted based on a characteristic associated with at least one of the plurality of resources of the cloud computing system 100. In some implementations, at least one of the fraud thresholds assigned to the plurality of resources is lowered based on a characteristic associated with at least one of the plurality of resources of the cloud computing system 100. In some implementations, the characteristic associated with at least one of the plurality of resources is at least one of: a capacity percentage associated with one or more of the plurality of resources, a fraud distribution associated with one or more of the plurality of resources, a cost of operation associated with one or more of the plurality of resources, an anticipated or actual subscriber growth rate associated with one or more of the plurality of resources, or an anticipated or actual subscriber fraud risk associated with one or more of the plurality of resources.

At block 708, at least one subscriber associated with the cloud computing system 100 is suspended or terminated based on the adjusted at least one of the fraud thresholds.

Figure 8:
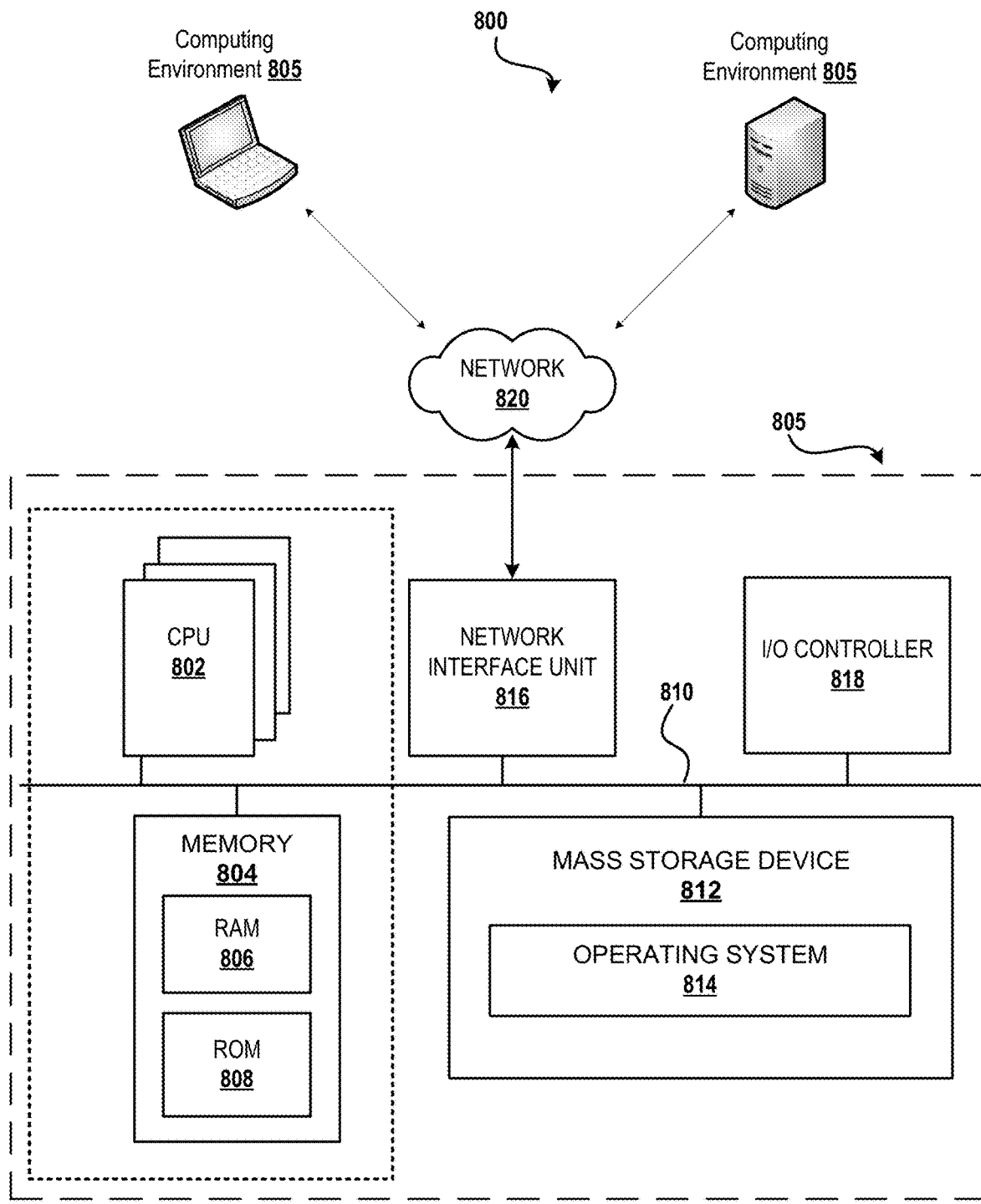
FIG. 8 illustrates an exemplary computer architecture for a computer(s) capable of executing the herein described methods.

FIG. 8 illustrates an exemplary computer architecture 800 for a computer(s) capable of executing the herein described methods. The computer architecture 800 illustrated in FIG. 8 includes at least one computing environment 805 that may include a central processing unit 802 ("CPU"), a system memory 804, including a random-access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 814, other data, and one or more application programs. A plurality of computing environments 805 are illustrated in FIG. 8.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium," "computer-readable storage medium" and variations thereof, does not include waves, signals, and/or other transitory and/or intangible communication media, per se.

According to various techniques, the computer architecture 800 may operate in a networked environment using logical connections the computing environments 805 through a network 820 and/or another network (not shown). The computer architecture 800 may connect to the network 820 through a network interface unit 816 connected to the bus 810. It should be appreciated that the network interface unit 816 also may be utilized to connect to other types of networks and remote computer systems. The computer architecture 800 also may include an input/output controller 818 for receiving and processing input from a number of other devices, including a keyboard, mouse, or electronic stylus (not shown in FIG. 8). Similarly, the input/output controller 818 may provide output to a display screen, a printer, or other type of output device (also not shown in FIG. 8). It should also be appreciated that via a connection to the network 820 through a network interface unit 816, the computing architecture may communicate with other computing devices.

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements and/or chipset, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Computing system 800, described above, can be deployed as part of a computer network. In general, the above description for computing environments applies to both server computers and client computers deployed in a network environment.

Figure 9:
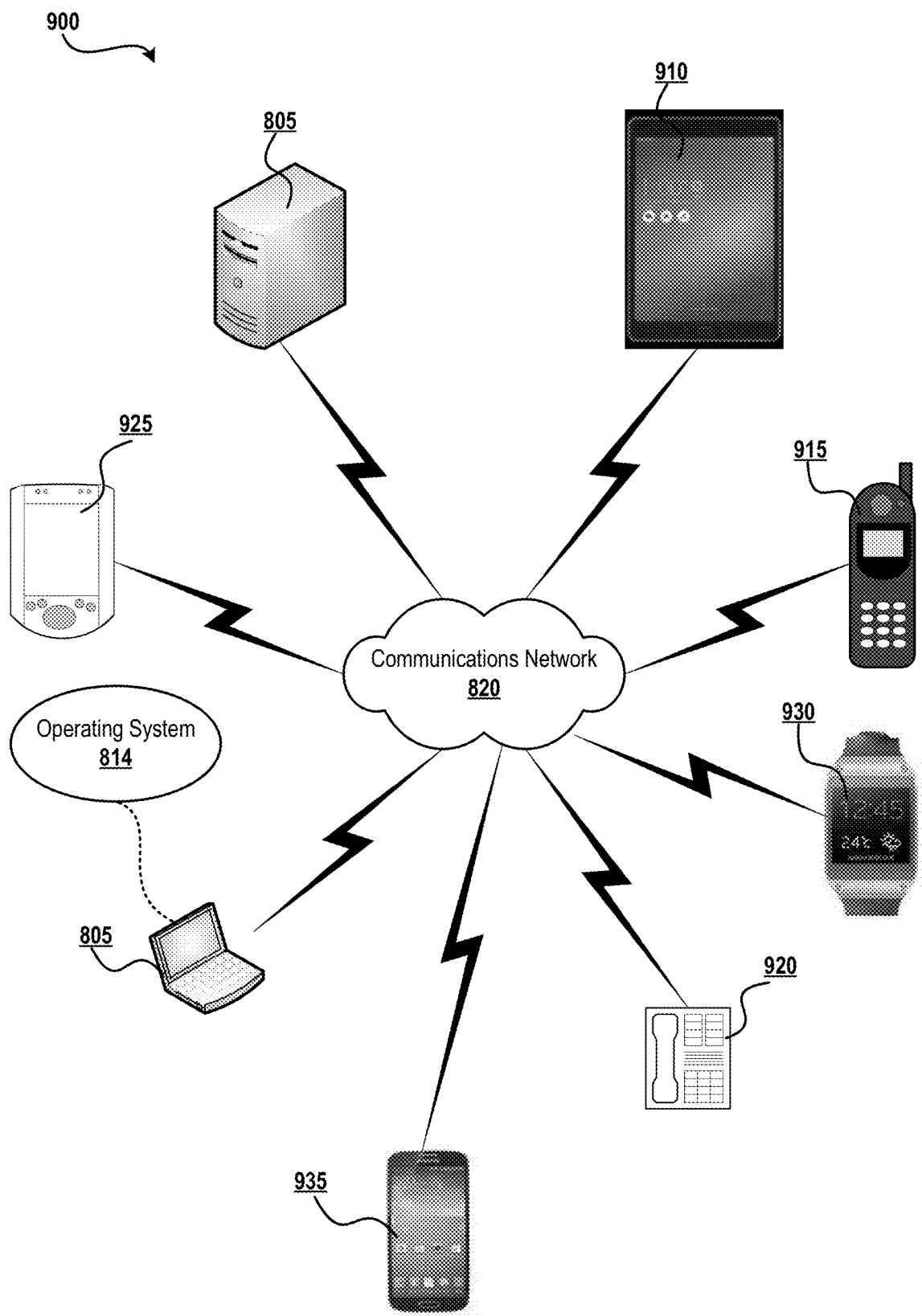
FIG. 9 shows additional details of illustrative computing devices operating in accordance with the herein described systems and methods.

FIG. 9 illustrates an exemplary illustrative networked computing environment 900, with client and/or server computers in communication via a communications network, in which the herein described apparatus and methods may be employed. As shown in FIG. 9, one or more computing devices may be interconnected via a communications network 820 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing environments such as a tablet personal computer 910, a mobile telephone 915, a telephone 920, a personal computer(s)905, a personal digital assistant 925, a smart phone watch/personal goal tracker (e.g., Apple Watch, Samsung, FitBit, etc.) 930, and a smart phone 935. In a network environment in which the communications network 820 is the Internet, for example, server(s) in the network 820 can be dedicated computing environment servers operable to process and communicate data to and from client computing environments 805, 910, 915, 920, 925, 930, and 935 via any of a number of known protocols, such as, hypertext transfer protocol (HTTP), file transfer protocol (FTP), simple object access protocol (SOAP), or wireless application protocol (WAP). Additionally, the networked computing environment 900 can utilize various data security protocols such as secured socket layer (SSL) or pretty good privacy (PGP). Each of the client computing environments 805, 910, 915, 920, 925, 930, and 935 can be equipped with operating system 814 operable to support one or more computing applications or terminal sessions such as a web browser (not shown), or other graphical user interface (not shown), or a mobile desktop environment (not shown) to gain access to the server computing environment(s).

Server(s) of the network 820 may be communicatively coupled to other computing environments (not shown) and receive data regarding the participating user's interactions/resource network. In an illustrative operation, a user (not shown) may interact with a computing application running on a client computing environment(s) to obtain desired data and/or computing applications. The data and/or computing applications may be stored on server computing environment(s) and communicated to cooperating users through client computing environments 805, 910, 915, 920, 925, 930, and 935, over an exemplary communications network 820. A participating user (not shown) may request access to specific data and applications housed in whole or in part on computing environment(s) 805, 910, 915, 920, 925, 930, 935. These data may be communicated between client computing environments 905, 910, 915, 920, 925, 930, 935 and server computing environment(s) for processing and storage. Server computing environment(s) may host computing applications, processes and applets for the generation, authentication, encryption, and communication of data and applications and may cooperate with other server computing environments (not shown), third party service providers (not shown), network attached storage (NAS) and storage area networks (SAN) to realize application/data transactions.

The disclosure presented herein may be considered in view of the following examples.

Example 1: A system for managing subscriber fraud associated with a computing system, the system comprising: at least one processor; at least one memory in communication with the at least one processor, the at least one memory having computer-readable instructions stored thereupon that, when executed by the at least one processor, cause the at least one processor to: identify a first resource in the computing system, the first resource having a first plurality of subscribers linked thereto; identify a second resource in the computing system, the second resource having a second plurality of subscribers linked thereto; assign a first fraud threshold to the first resource in the computing system; assign a second fraud threshold to the second resource in the computing system; adjust at least one of the first and second fraud thresholds based on a characteristic associated with at least one of the first and second resources in the computing system; and suspend or terminate at least one subscribers associated with the computing system based on the adjusted at least one of the first and second fraud thresholds.

Example 2. The system of example 1, wherein the computing system is a cloud computing system, and the first and second resources are data centers associated with the cloud computing system.

Example 3. The system of example 1, wherein the characteristic associated with at least one of the first and second resources is at least one of a capacity percentage associated with the first resource or the second resource, a fraud distribution among the first resource and the second resource, a cost of operation associated with the first resource or the second resource, an anticipated or actual subscriber growth rate associated with the first resource or the second resource, or an anticipated or actual subscriber fraud risk associated with the first resource or the second resource.

Example 4. The system of example 3, wherein the characteristic associated with at least one of the first and second resources is a capacity percentage associated with the first resource, the capacity percentage associated with the first resource being greater than a capacity percentage associated with the second resource, and wherein the computer-readable instructions cause the at least one processor to lower the first fraud threshold based on the capacity percentage associated with the first resource.

Example 5. The system of example 4, wherein the computer-readable instructions cause the at least one processor to increase the second fraud threshold to balance the lowering of the first fraud threshold.

Example 6. The system of example 1, wherein the first fraud threshold and the second fraud threshold are collectively linked to a key performance indicator (KPI) of the computing system, the KPI setting a baseline requirement that the computing system identify a predetermined percentage of the unauthorized and fraudulent subscribers in the computing system while ensuring that erroneously identified unauthorized and fraudulent subscribers does not exceed a predetermined percentage.

Example 7. The system of example 1, wherein the computer-readable instructions cause the at least one processor to lower the first fraud threshold based on the characteristic associated with at least one of the first and second resources in the computing system and increase the second fraud threshold based on the characteristic associated with at least one of the first and second resources in the computing system.

Example 8. The system of example 1, wherein the first fraud threshold and the second fraud threshold are each a fraud threshold value greater than or equal to 0 and less than or equal to 1, wherein a fraud threshold value approaching 0 signifies a low tolerance of unauthorized and fraudulent subscriber use of one or more resources in the computing system, and a fraud threshold value approaching 1 signifies a high tolerance of unauthorized and fraudulent subscriber use of one or more resources in the computing system.

Example 9. A computer-implemented method, comprising: assigning a first fraud threshold to a first data center associated with a cloud computing system; assigning a second fraud threshold to a second data center associated with the cloud computing system; adjusting at least one of the first and second fraud thresholds based on a characteristic associated with at least one of the first and second data centers associated with the cloud computing system; and suspending or terminating one or more subscribers associated with the cloud computing system based on the adjusted at least one of the first and second fraud thresholds.

Example 10. The computer-implemented method of example 9, wherein the characteristic associated with at least one of the first and second data centers is at least one of a capacity percentage associated with the first data center or second data center, a fraud distribution among the first and second data centers, a cost of operation associated with the first data center or second data center, an anticipated or actual subscriber growth rate associated with the first data center or second data center, or an anticipated or actual subscriber fraud risk associated with the first data center or second data center.

Example 11. The computer-implemented method of example 10, wherein the characteristic associated with at least one of the first and second data centers is a capacity percentage associated with the first data center, the capacity percentage associated with the first data center being greater than a capacity percentage associated with the second data center, the computer-implemented method decreasing the first fraud threshold based on the capacity percentage associated with the first data center.

Example 12. The computer-implemented method of example 11, comprising increasing the second fraud threshold to balance the lowering of the first fraud threshold.

Example 13. The computer-implemented method of example 9, wherein the first fraud threshold and the second fraud threshold are collectively linked to a key performance indicator (KPI) of the cloud computing system, the KPI setting a baseline requirement that the cloud computing system identify a predetermined percentage of the unauthorized and fraudulent subscribers in the cloud computing system while ensuring that erroneously identified unauthorized and fraudulent subscribers do not exceed a predetermined percentage.

Example 14. The computer-implemented method of example 9, comprising decreasing the first fraud threshold based on the characteristic associated with at least one of the first and second data centers in the cloud computing system and increasing the second fraud threshold based on the characteristic associated with at least one of the first and second data centers in the cloud computing system.

Example 15. The computer-implemented method of example 9, wherein the first fraud threshold and the second fraud threshold are each a fraud threshold value greater than or equal to 0 and less than or equal to 1, wherein a fraud threshold value approaching 0 signifies a low tolerance of unauthorized and fraudulent subscriber use of one or more data centers in the cloud computing system and a fraud threshold value approaching 1 signifies a high tolerance of unauthorized and fraudulent subscriber use of one or more data centers in the cloud computing system.

Example 16. A computer-readable storage medium having computer-executable instructions stored thereupon which, when executed by one or more processors of a computing device, cause the one or more processors of the computing device to: assign a first fraud threshold to a first resource in a cloud computing system; assign a second fraud threshold to a second resource in the cloud computing system; adjust the first and second fraud thresholds based on a characteristic associated with at least one of the first and second resources in the cloud computing system; and suspend or terminate one or more subscribers associated with the cloud computing system based on the adjusted at least one of the first and second fraud thresholds.

Example 17. The computer-readable storage medium of example 16, wherein the characteristic associated with at least one of the first and second resources is at least one of a capacity percentage associated with the first resource or the second resource, a fraud distribution among the first and second resources, a cost of operation associated with the first resource or the second resource, an anticipated or actual subscriber growth rate associated with the first resource or the second resource, or an anticipated or actual subscriber fraud risk associated with the first resource or the second resource.

Example 19. The computer-readable storage medium of example 17, wherein the characteristic associated with at least one of the first and second resources is a capacity percentage associated with the first resource, the capacity percentage associated with the first resource being greater than a capacity percentage associated with the second resource, and wherein the computer-executable instructions, when executed by one or more processors of the computing device, cause the one or more processors of the computing device to lower the first fraud threshold based on the capacity percentage associated with the first resource and increase the second fraud threshold.

Example 20. The computer-readable storage medium of example 16, wherein the first fraud threshold and the second fraud threshold are each a fraud threshold value greater than or equal to 0 and less than or equal to 1, wherein a fraud threshold value approaching 0 signifies a low tolerance of unauthorized and fraudulent subscriber use of one or more resources in the cloud computing system and a fraud threshold value approaching 1 signifies a high tolerance of unauthorized and fraudulent subscriber use of one or more resources in the cloud computing system.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for managing subscriber fraud, the system comprising:
   at least one processor;
   at least one memory in communication with the at least one processor, the at least one memory having computer-readable instructions stored thereupon that, when executed by the at least one processor, cause the at least one processor to:
   assign a fraud threshold value to a data center;
   determine that consumption of components that comprise the data center has increased from a first usage percentage to a second usage percentage, thereby decreasing an available capacity percentage for the components;
   decrease the fraud threshold value in response to determining that the consumption of the components that comprise the data center has increased from the first usage percentage to the second usage percentage;
   determine that a fraud score associated with activity of a subscriber associated with the data center is greater than the decreased fraud threshold value; and
   suspend the subscriber associated with the data center in response to determining that the fraud score associated with the activity of the subscriber is greater than the decreased fraud threshold value.

2. The system of claim 1, wherein the fraud threshold value is further decreased or increased based on a characteristic that includes fraud distribution among a plurality of the data centers.

3. The system of claim 1, wherein the fraud threshold value is further decreased or increased based on a characteristic that includes a cost of operation associated with the data center.

4. The system of claim 1, wherein the fraud threshold value is further decreased or increased based on a characteristic that includes anticipated or actual subscriber growth rate associated with the data center.

5. The system of claim 1, wherein the fraud threshold value is further decreased or increased based on a characteristic that includes anticipated or actual subscriber fraud risk associated with the data center.

6. The system of claim 1, wherein the fraud score is a value calculated based on one or more usage features of the subscriber associated with a plurality of data centers.

7. The system of claim 1, wherein the fraud score is a value that indicates a statistical probability that the subscriber is an unauthorized or fraudulent user of a plurality of data centers.

8. The system of claim 1, wherein the components include at least one of a processing core, a computing storage, or a virtual machine.

9. A method managing subscriber fraud, the method comprising:
   assigning a fraud threshold value to a data center;
   determining that consumption of components that comprise the data center has increased from a first usage percentage to a second usage percentage, thereby decreasing an available capacity percentage for the components;
   decreasing the fraud threshold value in response to determining that the consumption of the components that comprise the data center has increased from the first usage percentage to the second usage percentage;
   determining that a fraud score associated with activity of a subscriber associated with the data center is greater than the decreased fraud threshold value; and
   suspending the subscriber associated with the data center in response to determining that the fraud score associated with the activity of the subscriber is greater than the decreased fraud threshold value.

10. The method of claim 9, wherein the fraud threshold value is further decreased or increased based on a characteristic that includes fraud distribution among a plurality of the data centers.

11. The method of claim 9, wherein the fraud threshold value is further decreased or increased based on a characteristic that includes a cost of operation associated with the data center.

12. The method of claim 9, wherein the fraud threshold value is further decreased or increased based on a characteristic that includes anticipated or actual subscriber growth rate associated with the data center.

13. The method of claim 9, wherein the fraud threshold value is further decreased or increased based on a characteristic that includes anticipated or actual subscriber fraud risk associated with the data center.

14. The method of claim 9, wherein the components include at least one of a processing core, a computing storage, or a virtual machine.

15. A non-transitory computer storage medium storing computer-executable instructions stored thereupon which, when executed by one or more processors of a computing device, cause the one or more processors of the computing device to:
   assign a fraud threshold value to a data center;
   determine that consumption of components that comprise the data center has increased from a first usage percentage to a second usage percentage, thereby decreasing an available capacity percentage for the components;
   decrease the fraud threshold value in response to determining that the consumption of the components that comprise the data center has increased from the first usage percentage to the second usage percentage;
   determine that a fraud score associated with activity of a subscriber associated with the data center is greater than the decreased fraud threshold value; and
   suspend the subscriber associated with the data center in response to determining that the fraud score associated with the activity of the subscriber is greater than the decreased fraud threshold value.

16. The non-transitory computer storage medium of claim 15, wherein the fraud threshold value is further decreased or increased based on a characteristic that includes fraud distribution among a plurality of the data centers.

17. The non-transitory computer storage medium of claim 15, wherein the fraud threshold value is further decreased or increased based on a characteristic that includes a cost of operation associated with the data center.

18. The non-transitory computer storage medium of claim 15, wherein the fraud threshold value is further decreased or increased based on a characteristic that includes anticipated or actual subscriber growth rate associated with the data center.

19. The non-transitory computer storage medium of claim 15, wherein the fraud threshold value is further decreased or increased based on a characteristic that includes anticipated or actual subscriber fraud risk associated with the data center.

20. The non-transitory computer storage medium of claim 15, wherein the components include at least one of a processing core, a computing storage, or a virtual machine.

\* \* \* \* \*